July 14, 1936.  M. E. THOMPSON  2,047,528
SYNCHRONOUS MOTOR
Filed Sept. 11, 1935   2 Sheets-Sheet 1

INVENTOR
Milton E. Thompson
BY
Bartlett, Eyre, Scott & Keel
ATTORNEYS

July 14, 1936.  M. E. THOMPSON  2,047,528
SYNCHRONOUS MOTOR
Filed Sept. 11, 1935  2 Sheets-Sheet 2
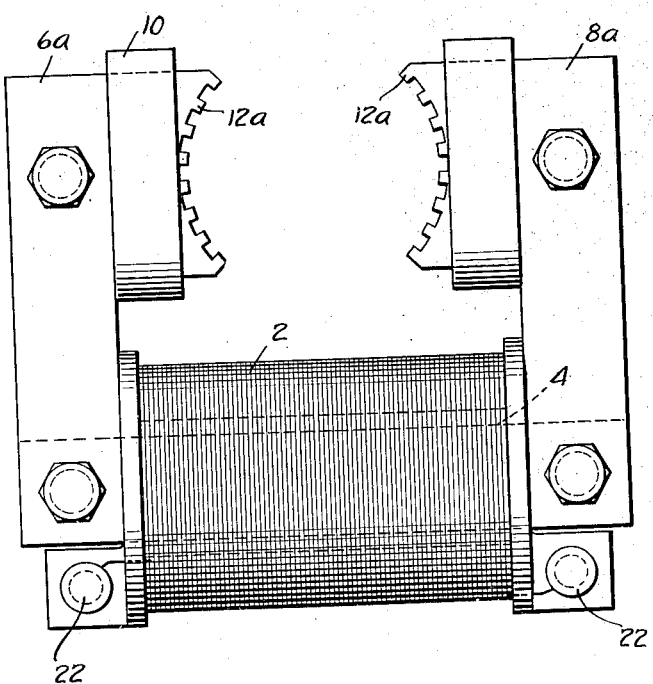
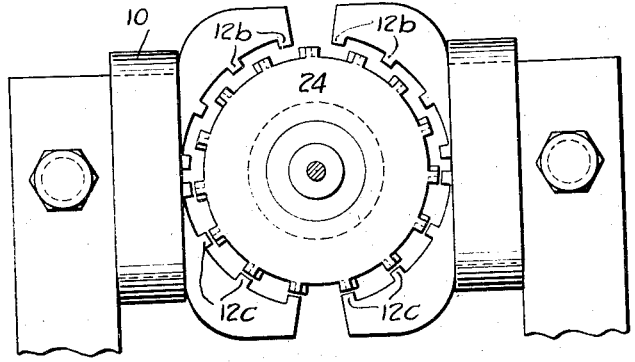
INVENTOR
Milton E. Thompson
BY
Bartlett, Eyre, Scott & Keel
ATTORNEYS Patented July 14, 1936

2,047,528

UNITED STATES PATENT OFFICE 2,047,528

SYNCHRONOUS MOTOR

Milton E. Thompson, Ridgway, Pa.

Application September 11, 1935, Serial No. 40,109

7 Claims. (Cl. 172—278)

The present invention relates to small synchronous motors for clocks or the like and comprises a single-input bi-polar motor of novel construction which operates efficiently and quietly on a fraction of the power input required by motors now on the market. The new motor may be constructed to run at relatively low speeds, does not overheat and has uni-directional rotation.

The particular motor illustrated in the accompanying drawings and hereinafter more particularly described is not self starting but certain of the novel features of the invention are applicable to self starting as well as to non self starting motors as will be apparent to those skilled in the art.

For an understanding of the invention reference may be had to the accompanying drawings of which:

Fig. 4 is a face view of another form of field structure suitable for use with the rotor of Fig. 1; and Fig. 5 is a face view of the pole faces and rotor of a motor constructed according to the invention and representing another embodiment thereof.

Figure 1:
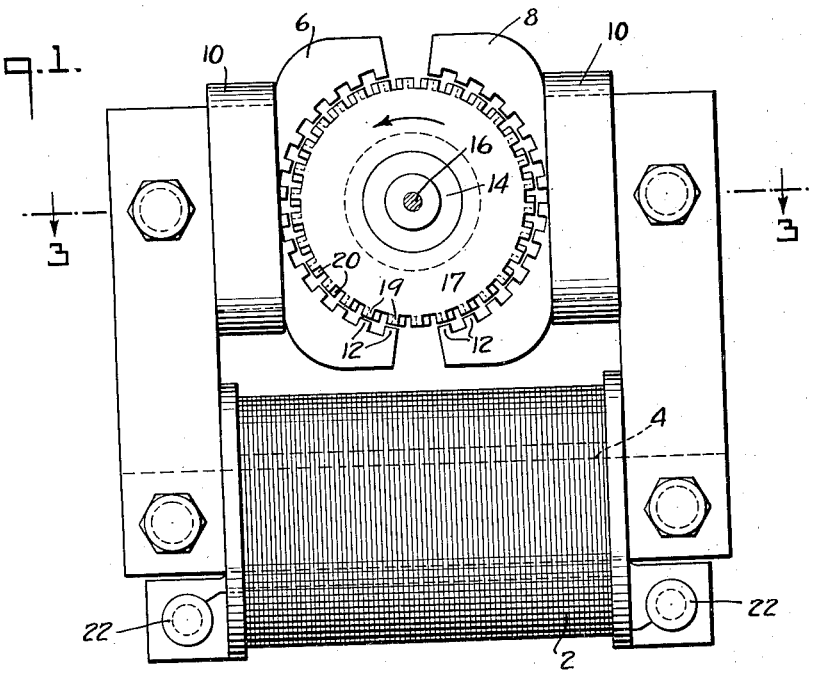
Fig. 1 is a face view of a motor constructed according to the invention and representing the preferred embodiment thereof.
Figure 2:
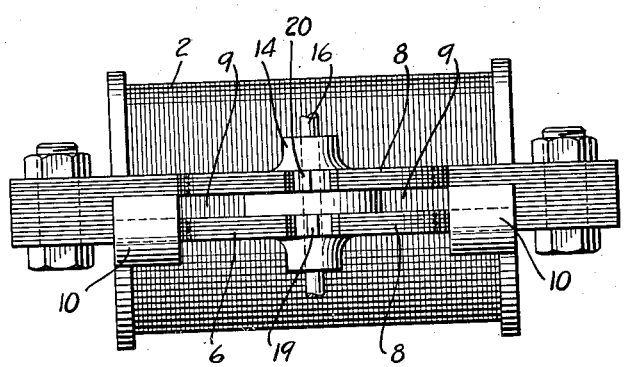
Fig. 2 is a plan view of the motor of Fig. 1.
Figure 3:
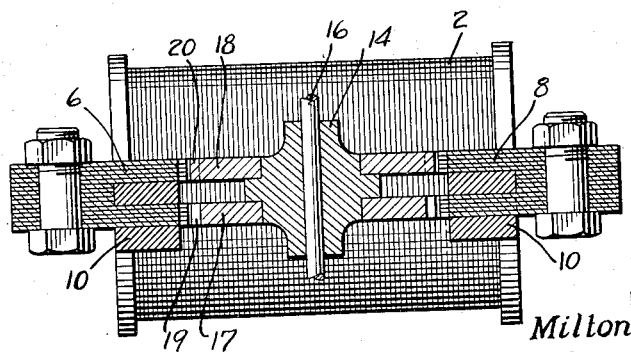
Fig. 3 is a sectional view of the motor taken along the line 3—3 of Fig. 1.

The field of the motor illustrated in Figs. 1 to 3 inclusive comprises a single field coil 2, a laminated core 4 and laminated pole pieces 6 and 8. Coil 2 is of a relatively large number of turns of fine enameled copper wire. Each pole piece, in the preferred embodiment of the invention illustrated, is built up of fifteen laminations of sheet steel and each piece is provided with a deep slot 9, perpendicular to the axis of rotation of the rotor, dividing the pole piece into front and rear sections of substantially equal thickness. Each slot 9 receives a shading band 10 of solid copper which completely encircles the front section of the pole piece. Each section of each pole piece is provided with spaced teeth 12 along the periphery of the arcuate portions facing the rotor. In the particular embodiment of the invention illustrated the tooth pitch is twelve degrees as measured from the rotor axis and the teeth 12 on one section of a pole face are in alinement with the teeth on the other section of that pole face.

The rotor comprises a central hub portion 14 mounted on a shaft 16 and carrying two disks 17 and 18 each of which is approximately of the thickness of one pole section and which are separated by a distance equal to the width of slots 9. Disk 17 is provided with a plurality of teeth 19 of the same pitch as teeth 12 and disk 18 is provided with similar teeth 20. The teeth 20 on disk 18 are advanced relatively to the teeth 19 on disk 17 through an angle between one fourth and one half of a tooth pitch. The circumferential width of the faces of each of teeth 12, 19 and 20 is five degrees. In the motor of Figs. 1 to 3, each pole section is provided with fourteen teeth and each rotor disk with thirty teeth.

With the above described construction, when sixty cycle alternating electro-motive force is applied across the terminal 22 of the field coil and the rotor is given an initial rotation, counterclockwise as viewed in Fig. 1, the torque created by the rotating field will quickly speed up the rotor until it is rotating in synchronism with the field. At synchronism each tooth 12 of the shaded pole sections of the field exerts a considerable forward pulling torque on teeth 19 of disk 17 and each tooth 12 of the unshaded pole sections exerts a similar forward pulling torque on teeth 20 of disk 18. The torque between cooperating field and rotor teeth varies with the relative position of the teeth and drops to zero when the teeth are in alinement. As any rotor tooth can only pass forward beyond the field tooth with which it has just been alined during the period of reversal of magnetization of the field tooth and as such reversal occurs twice during each alternating current cycle, it follows that but two rotor teeth can pass any one field tooth during one complete cycle. Therefore, at synchronism, if each rotor disk has thirty teeth, as in the embodiment illustrated, the rotor will make one complete rotation every fifteen cycles of magnetization and the motor when operated on sixty cycle alternating current will run at 240 R. P. M. The teeth of the shaded front section of each pole exert maximum forward torque upon rotor teeth 19 at the moment when a slight negative or backward torque is exerted upon rotor teeth 20 by the teeth of the unshaded sections and vice versa. Thus because of the novel rotor and field constructions there is an overlapping of positive and negative torque which produced a resultant torque on the rotor as a whole and this resultant torque never reverses and is, in fact, fairly constant at all times. This nearly constant forward torque gives a high degree of stability to the motor and prevents hunting even under severe voltage changes.

In the preferred embodiment of the invention, as above indicated, each pole piece section has fourteen teeth, each rotor disk has thirty teeth and the speed of the motor is 240 R. P. M. Without substantially impairing the operation of the motor, various changes could be made in the number and distribution of the polar and rotor teeth. For example, a satisfactory field structure, for use with the rotor of Figs. 1 to 3, is that illustrated in Fig. 4 wherein the pole faces 6a and 8a are split into shaded and unshaded sections as in the embodiment illustrated in Figs. 1 to 3 by slots perpendicular to the axis of rotation of the motor and but eight teeth 12a of the same pitch as those of the rotor are provided on each pole face section. A motor having the field structure of Fig. 4 and the rotor of Figs. 1 to 3 will operate substantially as described in connection with the preferred embodiment of the invention and at the same speed, namely 240 R. P. M. As compared with the field structure of the motor of Fig. 1, the arrangement of Fig. 4 corresponds to the suppression of the first and last three polar teeth of each pole piece section.

The embodiment of the invention illustrated in Fig. 5 is an example of another possible field structure in which each pole piece section has but eight teeth. As compared with the field structure of the motor of Fig. 1 the arrangement of Fig. 5 corresponds to the suppression of the second, fourth, sixth, ninth, eleventh and thirteenth teeth, counting from the bottom, of each pole piece section. Thus each pole piece section has the teeth 12b on its upper half staggered relatively to the teeth 12c on the lower half of that section while the tooth pitch of each half of each section is twice that of the teeth of the pole piece sections of the motor of Fig. 1 or of that of Fig. 4. With the field structure of Fig. 5, the rotor of Figs. 1 to 3, without change, or a rotor such as illustrated at 24, in which each disk has but fifteen teeth could be used. In either case the motor speed will still be 240 R. P. M. Rotor 24, like the rotor of Figs. 1 to 3 comprises two toothed disks of which the teeth on the disk cooperating with the unshaped pole pieces are advanced anywhere from three to six degrees as measured from the axis of rotation of the rotor. Structurally rotor 24 corresponds to the rotor of Fig. 1 with alternate teeth removed from each disk.

Various embodiments of the invention have now been illustrated and described in each of which the field structure includes a pair of pole pieces slit perpendicularly to the axis of rotation of the motor, one section of each pole face being shaded, and each section being provided with teeth. The rotor in each embodiment of the invention illustrated and described includes a pair of toothed disks, one cooperating with the shaded pole piece sections and the other cooperating with the unshaded pole piece sections. In each of the embodiments illustrated a fairly constant uni-directional torque is obtained because of the advance of the teeth on the rotor disk cooperating with the unshaded pole sections relative to the teeth on the other rotor disk and because of the alinement of the teeth on the unshaded and shaded pole piece sections. The same effect could be obtained with a rotor having alined teeth on its two disks, or having but a single disk of sufficient width to cooperate with both pole piece sections, provided the teeth on the shaded pole piece sections were advanced relatively to those on the unshaded pole piece sections. In either arrangement the magnetic pull of the teeth of the unshaded pole section upon the rotor teeth occurs prior to the magnetic pull of the teeth of the shaded pole section upon the rotor teeth.

The following is claimed:

1. A single phase synchronous motor having a toothed rotor and a bi-polar field structure, including a single field coil and pole pieces having arcuate faces cooperating with said rotor, each pole piece being slit into two sections on a plane perpendicular to the axis of rotation of the rotor, a pair of shading bands one about one section of each pole piece, and cooperating teeth on said rotor and on the arcuate faces of said pole sections, the teeth being so distributed that during any magnetic cycle the pull on the rotor teeth exerted by the teeth on an unshaded polar section precedes the pull on the rotor teeth exerted by the teeth on the shaded polar section.

2. A single coil bi-polar synchronous motor including a rotor and a pair of pole pieces divided into sections on a plane perpendicular to the axis of rotation of the rotor, a shading band on one section of one pole piece, a shading band on the corresponding section of the other pole piece, said rotor comprising a pair of disks one positioned to rotate between the unshaded pole piece sections and the other positioned to rotate between the shaded pole piece sections, and cooperating teeth on said rotor disks and on said pole piece sections, the teeth on the shaded and unshaded sections of each pole piece being in alinement and the teeth on the rotor disk cooperating with the unshaded pole piece sections being advanced relatively to those on the other rotor disk.

3. A motor according to claim 2 wherein the advance of the teeth on the one rotor disk relative to the teeth on the other rotor disk is between one fourth and one half of a tooth pitch.

4. A motor according to claim 2 wherein the teeth on the pole piece sections and on the rotor disks have the same pitch and are uniformly distributed along the cooperating surfaces of pole pieces and rotor.

5. A single phase synchronous motor having a rotor and a bi-polar field structure including a single field coil and laminated pole pieces having arcuate faces cooperating with said rotor, said rotor comprising a pair of disks each provided with uniformly spaced teeth about its periphery, the teeth of one disk being shifted circumferentially relative to the teeth on the other disk, said pole pieces each being divided into sections by a slot extending perpendicular to the axis of rotation of the rotor, and each section being provided with alined teeth along the arcuate faces thereof for cooperating with the teeth of said rotor disks, and means for shading corresponding sections of each pole piece.

6. The motor according to claim 5 wherein the teeth on one half of each pole piece section are staggered relatively to the teeth on the other half of the same pole piece section.

7. The motor according to claim 5 wherein each pole piece section has fourteen uniformly spaced teeth and each rotor disk has thirty uniformly spaced teeth and the teeth on the rotor disk cooperating with the unshaded pole piece sections are advanced between one fourth and one half of the tooth pitch.

MILTON E. THOMPSON.